United States Patent Office 3,004,558
Patented Oct. 17, 1961

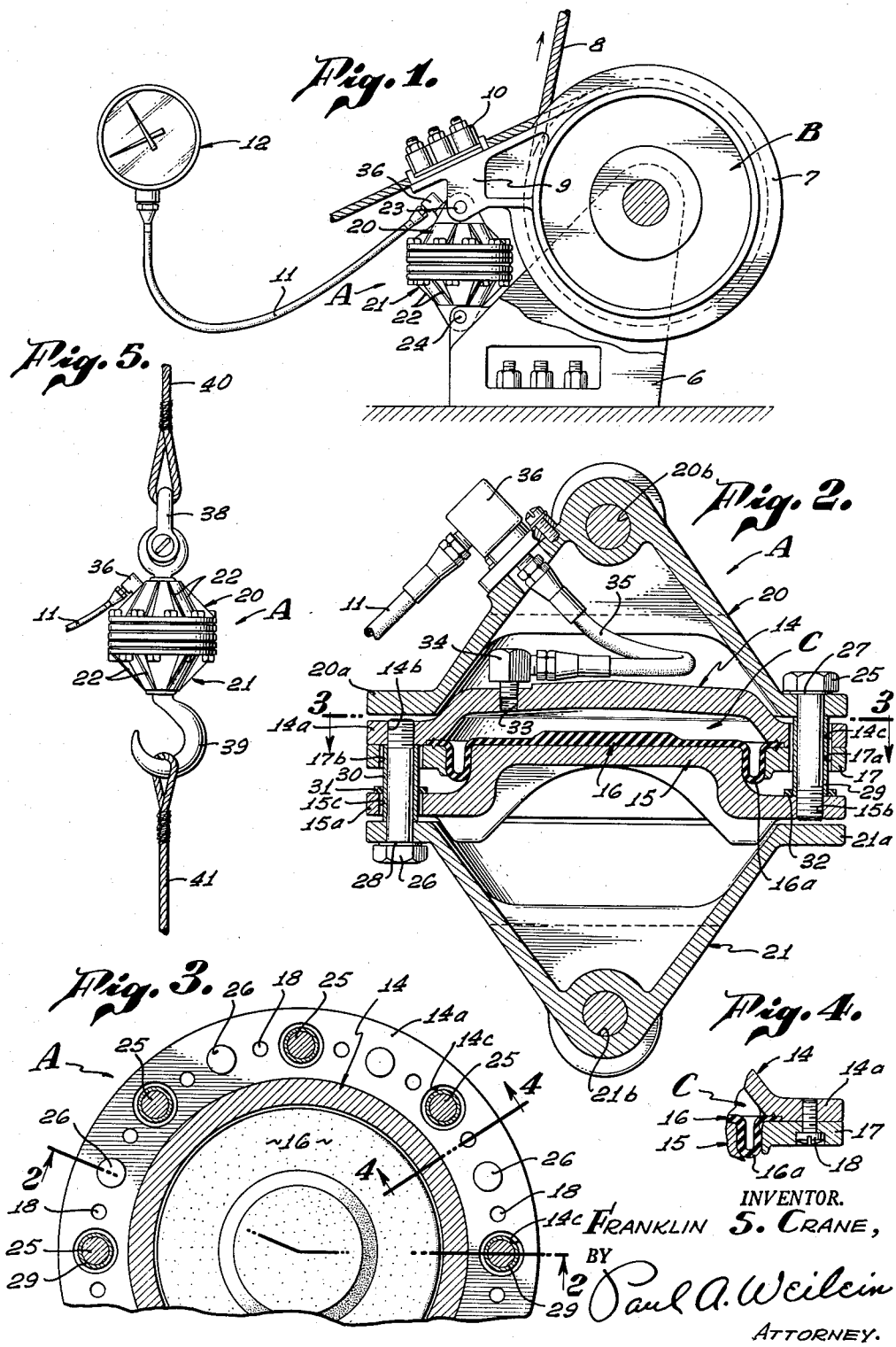

3,004,558
HYDRAULIC SENSING DEVICE FOR LOAD
INDICATING APPARATUS
Franklin S. Crane, Long Beach, Calif., assignor to Martin-Decker Corporation, Long Beach, Calif., a corporation of Delaware
Filed Jan. 29, 1954, Ser. No. 407,140
16 Claims. (Cl. 137—778)

This invention relates to hydraulic sensing devices such as used in connection with apparatus for indicating the loads sustained by the lines or cables of tackle systems in cranes, derricks and similar equipment.

An object of this invention is to provide an improved hydraulic sensing device of this character, wherein a novel force translating means operates to convert tension forces into compression forces for actuating the sensing device in a manner assuring reliability and accuracy of performance thereof.

It is another object of this invention to provide a hydraulic sensing device in which the aforesaid novel force translating means makes it possible to use a simply constructed, compact and reliable means for transforming the mechanical load applied thereto to a proportionate hydraulic pressure for actuating a gauge or indicator.

Another object hereof is the provision of a hydraulic sensing device such as described, in which the aforesaid novel means for translating tension forces to compression forces makes it possible to employ as a simply constructed and compact part of the device, a diaphragm unit for the transforming the mechanical force applied thereto into an accurately proportionate hydraulic force.

It is another object hereof to provide a sensing unit such as described, which readily may be employed in connection with various types of force measuring and indicating apparatus, for example in weight indicators used in connection with cable anchors for oil well drilling apparatus, in devices for measuring loads or tension on lines or cables of various tackle systems of cranes or derricks and in torque indicators.

It is a further object of this invention to provide a diaphragm type hydraulic sensing device such as described, in which the diaphragm unit and the aforesaid force translating means are constructed and arranged so that the latter serves as a protective housing as well as harness for uniformly distributing a compression force to the diaphragm unit whereby the unit will convert such a force to an accurately proportionate hydraulic force.

An additional object hereof is the provision of a sensing device such as described which is constructed and arranged to minimize friction and provide maximum strength for minimum weight and bulk.

This invention possesses many other advantages and has other objects which may be made more easily apparent from a consideration of one embodiment of the invention. For this purpose there is shown one form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

FIG. 1 is a side elevation of a combined cable anchor and weight indicator which includes a hydraulic sensing device embodying the present invention;

FIG. 2 is an enlarged vertical sectional view of the hydraulic sensing unit of FIG. 1, taken on the line 2—2 of FIG. 3;

FIG. 3 is a fragmentary sectional view taken on the line 3—3 of FIG. 2;

FIG. 4 is a fragmentary sectional view taken on the line 4—4 of FIG. 3; and

FIG. 5 is a side elevation showing another application of a sensing element embodying the present invention.

A hydraulic sensing device A embodying the present invention is shown in FIG. 1 as forming a part of a combined cable anchor and weight indicator B such as employed in connection with well drilling apparatus. This combined cable anchor and weight indicator B includes a base 6 on which is mounted a rotary snubbing drum 7 around which is wound several turns of the cable 8 of the tackle system. A rigid lever arm 9 carried by the drum supports a cable anchor 10 for deadening the cable. The sensing device A is connected with the arm 9 and the base 6 for translating the mechanical force applied thereto to a hydraulic force which latter is applied through a flexible conduit 11 to a gauge or indicator 12 to indicate the load on the cable.

In accordance with this invention the sensing device is constructed so as to be compact, to provide maximum strength with minimum bulk, to withstand heavy loads imposed thereon and to provide for a uniform transformation of mechanical loads to a proportionate hydraulic pressure for accurately operating a gauge or indicator. These objects are achieved by the use of a novel diaphragm unit for forming a pressure chamber; in combination with what may be termed a "harness" of simple, strong and light construction arranged to uniformly apply operating forces to the diaphragm unit, free from mechanical friction and in a manner assuring accurate operation of the gauge or indicator.

As shown in FIG. 2, the sensing device A includes a hydraulic pressure chamber C formed between a pair of opposed plate-like and preferably circular members 14 and 15, with the aid of a flexible diaphragm 16. As shown in FIG. 4, the diaphragm is clamped about its periphery, by means of a ring 17 and screw fasteners 18, to the peripheral portion of the member 14 thereby forming the pressure chamber. The member 15 contacts the major portion of the outer surface of the diaphragm so that when a force is applied to move the members 14 and 15 toward each other a hydraulic pressure will be developed in the chamber C.

The members 14 and 15 are concavo-convex, having peripheral flanges 14a and 15a. These members are arranged so that the concave side of member 14 is opposed to the diaphragm 16 whereas the convex side of the member 15 is in contact with the diaphragm. The convex side of the member 15 is of smaller diameter than the concave side of the member 14 to permit sufficient movement of the members 14 and 15 to assure that the hydraulic pressures developed in the chamber will be proportionate to all mechanical forces applied to the unit. This arrangement also makes it possible to provide the diaphragm 16 with an annular fold 16a disposed between the ring 17 and the outer periphery of the convex portion of the member 15. In this connection it will be noted that the ring 17 and the member 15 provide radially spaced opposed shoulders extending circumferentially about the axis of the assembly. This arrangement aids in making the diaphragm unit self-aligning and subject to reliable and accurate operation without mechanical friction or undue stresses being applied thereto, the annular fold acting as a resilient centering means.

The means or "harness" for converting tension forces to compression forces includes a pair of rigid force-applying elements 20 and 21 between which the diaphragm unit is disposed. These force-applying elements form a protective housing for the diaphragm unit.

In order to withstand the heavy loads imposed thereon, the elements 20 and 21 are provided with reinforcing ribs 22 and marginal flanges 20a and 21a respectively. As here shown the elements 20 and 21 are conical and the apical portions thereof are provided with eyes 20b and 21b respectively. The eye 20b, as shown in FIG. 1, is adapted to be pivotally secured, as at 23, to the arm 9 on the drum 7 of the combined cable anchor and weight indicator B, whereas the eye 21b is pivoted as at 24 to the base 6. However, it is apparent that these eyes will provide for the attachment of the sensing device to cables, lines or any other elements which will apply tension forces for operating the device to measure the loads or weight in accordance with this invention. As these eyes are in line with the center of the diaphragm as well as the centers of the elements 20 and 21 and members 14 and 15, it is apparent that the forces applied to the elements 20 and 21 will be uniformly distributed to the members 14 and 15 for a reliable operation of the diaphragm unit.

In order that the tension forces which tend to move the force-applying elements 20 and 21 away from one another will be transformed to a compression force for actuating the diaphragm unit, each of the relatively movable members 14 and 15 is rigidly connected with the force-applying element farthest removed therefrom. Thus, the element 20 is rigidly connected with the member 15 by means of tie bolts 25, whereas the element 21 is connected with the member 14 by means of tie bolts 26. The bolts 25 and 26 are arranged alternately in a circular series and equi-distantly spaced from one another, as shown in FIG. 3. The bolts 25 pass through the flange 20a so that the bolt heads will rest on washers 27 on flange 20a, whereas the bolts 26 pass through the flange 21a so that the heads of the bolts rest on washers 28 on the flange 21a. The other ends of the bolts 25 and 26 are threadedly engaged in openings 15b and 14b in the members 15 and 14 respectively.

Registering openings 14a and 17a in the flange 14a and in the ring 17 respectively, accommodate the bolts 25 so that the member 15 will be moved toward the member 14 when a tension force is applied to the element 20. Similar registering openings 15c and 17b in the flange 15a and in the ring 17, respectively, accommodate the bolts 26 so that relative movement of the members 14 and 15 may take place for creating hydraulic pressure in the chamber C when tension forces are applied tending to move the force applying elements 20 and 21 away from one another.

Spacer sleeves 29 and 30 surround the bolts 25 and 26 respectively. The ends of the sleeves 29 abut the flange 20a and the flange 15a respectively. The ends of the sleeves 30 abut the flange 21a and the flange 14a respectively. These sleeves insure accurate positioning of the diaphragm unit and have ample clearance in the openings through which the bolts extend.

Rubber washers 31 and 32 serve as bumpers on the side of the flange 15a which is opposed to the ring 17 to cushion the impact in case the member 15 is moved sufficiently to cause the washers to strike the ring 17.

The member 14 is provided with a port 33 through which the chamber C may be filled and to which is connected, by means of a fitting 34, one end of a flexible conduit 35 housed in the member 20. The other end of the conduit 35 is connected with a fitting 36 on one side of the member 20 and which provides for connection with a line, such as the conduit 11, to apply hydraulic pressure to a gauge or indicator, such as the gauge 12, shown in FIG. 1.

*Operation*

In the use of the sensing device hereof, for example, in the combined cable anchor and indicator B shown in FIG. 1, as the load on the cable 8 causes the drum to turn, the lever arm 9 will swing upwardly and cause the element 20 to move away from the element 21 inasmuch as the latter is anchored to the base 6. As the element 20 moves in a direction away from member 21, a force is applied through the bolts 25 for moving the member 15 toward the member 14, which latter is anchored to the member 21 through the bolts 26. This movement of the member 15 causes the diaphragm 16 to move toward the anchored member 14, thereby developing in the chamber C and in the conduit lines leading to the gauge or indicator 12, a hydraulic pressure which is directly proportionate to the mechanical force applied through the members 20 and 21. In this manner the gauge or indicator will show the correct load on the cable 8.

It should be noted that the circular construction of the force applying elements 20 and 21 as well as the members 14 and 15, and the manner in which they are connected by the equidistantly spaced bolts, causes the forces to be equalized around the diaphragm so that it will react in the normal manner without possibility of collapse on one side.

It is also important to note that the diaphragm unit is self-aligning. The clearance spaces around the tie bolts and spacer sleeves make possible this self-aligning feature, as any reasonable angular or offset misalignment of the connection points is compensated by this arrangement and results in positive exclusion of mechanical friction from the unit. Moreover, it is important to note that the spacer sleeves not only insure accurate positioning of the diaphragm unit, but permit prestressing of the bolts. This results in a constant stress level in the bolts and eliminates fatigue failures.

Should the sensing device be installed in a manner such that a tension force is applied simultaneously tending to move the elements 20 and 21 in a direction away from the other member, the resultant compression force will move the members 14 and 15 toward one another. If the element 20 is stationary and the element 21 movable, then the member 14 will be moved towards the member 15 to develop hydraulic pressure in the chamber C.

As shown in FIG. 5, the hydraulic sensing device A is the same as that shown in FIG. 1, except that it is applied in a different manner than in FIG. 1 and is provided with an eye 38 and a hook 39 at the ends of the force applying elements 20 and 21 respectively, to facilitate the connection thereof between cables 40 and 41 such as may comprise a running line or a line which is tied down by a cable. In the case of a running line the force applying elements 20 and 21 will be moved in a direction away from one another, whereby the members 14 and 15 will move toward one another, thereby applying a compression force to the diaphragm unit to develop hydraulic pressure in the chamber C. In instances where cable 41 acts as an anchor, the device will operate in the same manner as described in connection with the arrangement shown in FIG. 1.

I claim:

1. A hydraulic sensing device, including: means providing a hydraulic pressure chamber adapted to contain a liquid; said means including a pair of opposed members relatively movable to develop hydraulic pressure in said chamber; one of said members having a port opening into said chamber; a pair of opposed relatively movable force-applying elements between which said members are disposed; and tie members connecting each element with the member of said pair farthest removed therefrom, operable to effect said relative movement between said members responsive to a force tending to move said elements in opposite directions, each of said tie members being extended through one of said members of said pair and directly connected with the other member of said pair.

2. A hydraulic sensing device including: a pair of opposed relatively movable members; a diaphragm arranged between said members to form with one of said members a hydraulic pressure chamber; said one member having a port opening into said chamber; a pair of opposed relatively movable force-applying elements between which said members are disposed; said members and said elements having corresponding surrounding marginal portions opposed to one another; and means cooperable with said marginal portions for connecting said elements with said members and operable to move one of said members toward the other of said members responsive to a force applied to move one of said elements away from the other of said elements.

3. A hydraulic sensing device including: means providing a chamber adapted to receive a liquid; said means including a pair of opposed relatively movable members and a diaphragm between said members; a pair of opposed relatively movable force-applying elements between which said members are disposed; bolts connected with each force-applying element; said bolts extending freely through the relatively movable member next adjacent each of said elements and joined to the relatively movable member farthest removed from each of said elements whereby forces applied to move said force-applying elements away from one another will cause said relatively movable members to move toward one another to develop hydraulic pressure in said chamber; and means providing for the transmission from said chamber of hydraulic pressure.

4. A hydraulic sensing device including: a pair of opposed relatively movable members; a diaphragm arranged between and contacting said members; means securing said diaphragm to one of said members to form therewith a chamber adapted to receive a liquid; a pair of opposed relatively movable force-applying elements between which said members are disposed; and tie members rigidly connecting each force applying element with the relatively movable member farthest removed therefrom for movement therewith, whereby forces applied to move said force applying elements away from one another will cause said members to be moved toward one another to develop hydraulic pressure in said chamber; one of said members having a port opening into said chamber to provide for transmission from said chamber of hydraulic pressure developed therein; said members having marginal portions provided with openings therein, said tie members being disposed in said openings.

5. A hydraulic sensing device including: means providing a hydraulic pressure chamber adapted to contain a liquid; said means including a pair of opposed members relatively movable to develop hydraulic pressure in said chamber; one of said members having a port opening into said chamber; a pair of opposed relatively movable force-applying elements between which said members are disposed; said members and said elements having opposed marginal portions surrounding said chamber; and tie members rigidly connecting the marginal portion of each force-applying element with the marginal portion of the member of said pair farthest removed from each force-applying element; said marginal portions of said opposed members having openings therein through which said tie members extend.

6. A hydraulic sensing device including: means providing a hydraulic pressure chamber adapted to contain a liquid; said means including a pair of opposed members relatively movable to develop hydraulic pressure in said chamber; one of said members having a port opening into said chamber; a pair of opposed relatively movable force-applying elements between which said members are disposed; said members and said elements having opposed circular marginal portions; the marginal portions on said members surrounding said chamber; a circular series of tie members connecting the marginal portion of one of said elements with the marginal portion of the member farthest removed therefrom; and another circular series of tie elements connecting the marginal portion of the other of said elements with the marginal portion of the member farthest removed therefrom.

7. A hydraulic sensing device including: means providing a chamber adapted to receive a liquid; said means including a pair of opposed relatively movable members and a diaphragm between said members; a pair of opposed relatively movable force-applying elements between which said members are disposed; said elements forming a housing substantially enclosing said members; said elements and said members having opposed marginal portions; the marginal portions of said members surrounding said chamber and having openings therein; tie members rigidly connecting the marginal portion of one of said elements with the marginal portion of the member next adjacent the other element; said tie members extending through the openings in the marginal portion of the other member; other tie members rigidly connecting the marginal portion of said other element with the marginal portion of said other member; said other tie members extending through the opening in the marginal portion of said one member; and means providing for the transmission from said chamber of hydraulic pressure.

8. A hydraulic sensing device including: means providing a hydraulic pressure chamber adapted to contain liquid; said means including a pair of opposed, relatively movable members and a diaphragm mounted between said members; one of said members having a port opening into said chamber; said members having opposed marginal portions extending around said members; a pair of opposed relatively movable force-applying elements between which said members are disposed; said elements having marginal portions opposed to the marginal portions of said members; rigid tie members connecting the marginal portion of one element with the marginal portion of the relatively movable member next adjacent the other element; other rigid tie members connecting the marginal portion of said other element with the marginal portion of the other relatively movable member; and spacer sleeves surrounding said tie members with their respective ends abutting the marginal portions which are joined by said tie members.

9. A hydraulic sensing device including: means providing a hydraulic pressure chamber adapted to contain liquid; said means including a pair of opposed, relatively movable concavo-convex members having continuous marginal portions, a diaphragm between said members, and means securing the marginal portion of the diaphragm to the marginal portion of one of said members; said one member having its concave side opposed to said diaphragm and being provided with a port opening into said chamber; the other member having its convex side of smaller diameter than the concave side of said one member and disposed in contact with said diaphragm; said diaphragm having a fold disposed between the periphery of said convex side and said securing means; opposed relatively movable force-applying elements between which said members are disposed; and means rigidly connecting said elements with said members, operable to move one of said members toward the other of said members responsive to forces applied for moving one of said elements in a direction away from the other of said elements.

10. A hydraulic sensing device including: means providing a chamber adapted to receive a liquid; said means including a pair of opposed relatively movable members and a diaphragm between said members; a pair of opposed relatively movable force-applying elements between which said members are disposed; said elements forming a housing substantially enclosing said members; said elements and said members having opposed marginal portions; the marginal portions of said members surrounding said chamber and having openings therein; tie members rigidly connecting the marginal portion of one of said elements with the marginal portion of the member next adjacent the other of said elements; said tie members extending through the openings in the marginal portion of the other member; other tie members rigidly connecting the marginal portion of said other element with the marginal portion of said other member; said other tie member extending through the opening in the marginal portion of said one member; one of said members having a port opening into said chamber; a fitting on the exterior of the element next adjacent the member having said port;

said fitting providing for the connection therewith of a conduit to transmit hydraulic pressure from the chamber; and a flexible conduit connecting said fitting with said port.

11. A hydraulic sensing device including: means providing a hydraulic pressure chamber adapted to contain a liquid; said means including a pair of opposed members relatively movable to develop hydraulic pressure in said chamber; one of said members having a port opening into said chamber; a pair of opposed relatively movable force-applying elements between which said members are disposed; said members having opposed marginal portions; said elements having opposed marginal portions between which the marginal portions of said members are disposed; means on said elements providing for connection of said elements with means for applying forces tending to move said elements apart; rigid tie members connecting the marginal portion of one of the elements of said pair with the marginal portion of that member of said pair which is farthest removed from said one element; and rigid tie members connecting the marginal portion of the other element of said pair with the marginal portion of the other member of said pair; said tie members passing through marginal portions of members of said pair.

12. A hydraulic sensing device including: means providing a hydraulic pressure chamber adapted to contain a liquid; said means including a pair of opposed members relatively movable to develop hydraulic pressure in said chamber; one of said members having a port opening into said chamber; a pair of opposed relatively movable force-applying elements between which said members are disposed; said members being circular; said elements being substantially conical and provided with annular marginal portions opposed to marginal portions of said members; means at the apical portions of said elements providing for connection of said elements with means for applying tension forces to said elements; a circular series of rigid tie members connecting the marginal portion of one of said elements with the marginal portion of the member farthest removed from said one element; and another circular series of rigid tie members connecting the marginal portion of the other element with the marginal portion of the other member.

13. A hydraulic sensing device including: means providing a hydraulic pressure chamber adapted to contain a liquid; said means including a pair of opposed members relatively movable to develop hydraulic pressure in said chamber; one of said members having a port opening into said chamber; a pair of opposed relatively movable force-applying elements between which said members are disposed; said members being circular; said elements being substantially conical and provided with annular marginal portions opposed to marginal portions of said members; means on said elements providing for connection of said elements with means for applying tension forces to said elements; a circular series of rigid tie members connecting the marginal portion of one of said elements with the marginal portion of the member farthest removed from said one element; and another circular series of rigid tie members connecting the marginal portion of the other element with the marginal portion of the other member; the marginal portions of said members having opening therein through which said tie members are extended.

14. A hydraulic sensing device including: means providing a hydraulic pressure chamber adapted to contain a liquid; said means including a pair of opposed members relatively movable to develop hydraulic pressure in said chamber; one of said members having a port opening into said chamber; a pair of opposed relatively movable force-applying elements between which said members are disposed; said members being circular; said elements being substantially conical and provided with annular marginal portions opposed to marginal portions of said members; means on said elements providing for connection of said elements with means for applying tension forces to said elements; a circular series of rigid tie members connecting the marginal portion of one of said elements with the marginal portion of the member farthest removed from said one element; another circular series of rigid tie members connecting the marginal portion of the other element with the marginal portion of the other member; the marginal portions of said members having openings therein through which said tie members are extended; and spacer sleeves surrounding said tie members having their ends abutting the marginal portions which are connected by the respective tie members.

15. A hydraulic sensing device including: means providing a hydraulic pressure chamber adapted to contain a liquid; said means including a pair of relatively movable members for subjecting the liquid in said chamber to pressure; one of said members having a port for the passage of liquid from and into said chamber; a pair of opposed relatively movable force-applying elements; said members being interposed between said elements; said members and said elements having opposed marginal portions; and a series of tie members connecting the marginal portion of the respective elements with the member farthest therefrom.

16. A hydraulic sensing device including: means providing a hydraulic pressure chamber adapted to contain a liquid; said means including a pair of opposed members relatively movable to develop hydraulic pressure in said chamber; one of said members having a port opening into said chamber; a pair of opposed relatively movable force-applying elements between which said members are disposed; said members having opposed marginal portions; said elements having opposed marginal portions between which the marginal portions of said members are disposed; means on said elements providing for connection of said elements with means for applying forces tending to move said elements apart; rigid tie members connecting the marginal portion of one of the elements of said pair with the marginal portion of that member of said pair which is farthest removed from said one element; and rigid tie members connecting the marginal portion of the other element of said pair with the marginal portion of the other member of said pair.

References Cited in the file of this patent

UNITED STATES PATENTS

| | | |
|---|---|---|
| 590,046 | McHenry | Sept. 14, 1897 |
| 608,344 | Nesmith | Aug. 2, 1898 |
| 1,091,599 | Stephens | Mar. 31, 1914 |
| 1,424,888 | Eason | Aug. 8, 1922 |
| 1,934,201 | Miller | Nov. 7, 1933 |
| 2,260,401 | Raphael | Oct. 28, 1941 |
| 2,675,977 | Von Berlichingen et al. | Apr. 20, 1954 |